US012769690B2

(12) United States Patent
Zhang

(10) Patent No.: US 12,769,690 B2
(45) Date of Patent: Oct. 20, 2026

(54) STORAGE CHASSIS AND DATA PROCESSING METHOD THEREOF, AND STORAGE SYSTEM

(71) Applicant: New H3C Information Technologies Co., Ltd., Hangzhou (CN)

(72) Inventor: Yuguo Zhang, Beijing (CN)

(73) Assignee: New H3C Information Technologies Co., Ltd., Hangzhou (CN)

( * ) Notice: Subject to any disclaimer, the term of this patent is extended or adjusted under 35 U.S.C. 154(b) by 0 days.

(21) Appl. No.: 19/042,500

(22) Filed: Jan. 31, 2025

(65) Prior Publication Data

US 2026/0086967 A1 Mar. 26, 2026

(30) Foreign Application Priority Data

Sep. 26, 2024 (CN) ........................ 202411361338.X

(51) Int. Cl.
*G06F 13/40* (2006.01)

(52) U.S. Cl.
CPC ...... *G06F 13/4022* (2013.01); *G06F 13/4081* (2013.01)

(58) Field of Classification Search
CPC .. G06F 13/4022; G06F 13/4081; G06F 13/40; G06F 13/4004; H04L 67/1097; H04L 12/46; H04L 12/4604; H04L 12/54; H04L 12/56
See application file for complete search history.

(56) References Cited

U.S. PATENT DOCUMENTS 9,363,315 B2 * 6/2016 Danilak .............. H04L 67/1097
2007/0233833 A1 * 10/2007 Wang ...................... H04L 41/04 709/223
2008/0043769 A1 * 2/2008 Hirai ....................... H04L 45/00 370/420
2013/0094351 A1 4/2013 Armstrong et al.

OTHER PUBLICATIONS

Extended European Search Report for EP 25154271.8 by European Patent Office dated May 28, 2025.
Gibbons, Terry "Switched SAS: Sharable, Scalable SAS Infrastructure White Paper", LSI Corporation, XP093278974, Dec. 2013.

* cited by examiner

*Primary Examiner* — Idriss N Alrobaye
*Assistant Examiner* — Richard B Franklin
(74) *Attorney, Agent, or Firm* — BROADVIEW IP LAW, PC

(57) ABSTRACT

The present disclosure provides a storage chassis and a data processing method thereof, and a storage system. The storage chassis provided in an example of the present disclosure integrates a backplane, a plurality of storage modules, and a plurality of switching modules, where a storage module local management network interface of each storage module is connected to each switching module through PCB traces on the backplane, and a storage module local storage network interface of each storage module is connected to each switching module through PCB traces on the backplane.

15 Claims, 5 Drawing Sheets

-Prior Art-

STORAGE CHASSIS AND DATA PROCESSING METHOD THEREOF, AND STORAGE SYSTEM

CROSS-REFERENCE TO RELATED APPLICATIONS

This application claims priority to Chinese Patent Application No. 202411361338.X filed on Sep. 26, 2024, which is incorporated herein by reference in its entirety for all purposes.

TECHNICAL FIELD

The present disclosure relates to the field of network communication technologies, and particularly to a storage chassis and a data processing method thereof, and a storage system.

BACKGROUND

With the continuous development of technology, the requirements for storage in managing switched networks are becoming higher and higher. Nowadays, in practical examples, switches are used to achieve communication and management of switched networks. For example, as shown in FIG. 1, a switch to connect various storage nodes to provide storage network transmission services may be referred to as a storage network switch, and by connecting to each storage node in order through the storage network switch, network communication between the storage nodes can be realized; a switch to manage the network may be referred to as a management network switch, and by connecting to each storage node and the storage network switch through the management network switch, management of the apparatus communication network can be realized. Among them, the storage nodes, the storage network switches, and the management network switch are all independent apparatuses, and the apparatuses are connected through physical connections (such as Ethernet cables, high-speed cables, optical fibers, etc.). However, the above method may increase cabling costs and time costs, thereby increasing the difficulty of apparatus deployment and maintenance.

SUMMARY

The present disclosure provides a storage chassis and a storage system to reduce cabling costs and time costs.

The present disclosure provides a storage chassis, where the storage chassis integrates a backplane, a plurality of storage modules, and a plurality of switching modules; each storage module of the plurality of storage modules is configured with a storage module local management network interface for connecting a management network, and a storage module local storage network interface for connecting a storage network; the storage module local management network interface of each storage module is connected to each switching module through printed circuit board (PCB) traces on the backplane, and the storage module local storage network interface of each storage module is connected to each switching module through the PCB traces on the backplane; each storage module is further configured with a baseboard management controller (BMC) and a network interface card;

- each storage module is to receive service data forwarded by a service network through a local network interface card;
- each storage module is to forward, through the storage module local storage network interface, the service data to each switching module connected with the storage module local storage network interface through the PCB traces;
- each switching module is to access the BMC of each storage module to obtain management data through the PCB traces between each storage module and each switching module.

The present disclosure provides a storage system, wherein the storage system includes two or more storage chassis;

- each of the storage chassis integrates a backplane, a plurality of storage modules, and a plurality of switching modules; each storage module of the plurality of storage modules is configured with a storage module local management network interface for connecting a management network and a storage module local storage network interface for connecting a storage network; the storage module local management network interface of each storage module is connected to each switching module through PCB traces on the backplane, and the storage module local storage network interface of each storage module is connected to each switching module through the PCB traces on the backplane; each storage module is further configured with a BMC and a network interface card; each storage module is to receive service data forwarded by a service network through a local network interface card; each storage module is to forward, through the storage module local storage network interface, the service data to each switching module connected with the storage module local storage network interface through the PCB traces; each switching module is to access the BMC of each storage module to obtain management data through the PCB traces between each storage module and each switching module;
- the local management network interfaces for connecting a management network and aa plurality of plurality of switching modules are configured with two or more switching module first switching module local storage network interfaces for connecting a storage network;
- the switching module local storage network interface of one or more switching modules located on each storage chassis is connected to the switching module local storage network interface of one or more switching module located on other storage chassis, such that connections between storage networks of two or more storage chassis are established; each switching module of each storage chassis is connected to a management network switch through one or more switching module first local management network interface to manage management networks of each storage chassis.

The present disclosure provides a data processing method applied to a storage chassis, where the storage chassis integrates a backplane, a plurality of storage modules, and a plurality of switching modules; each storage module of the plurality of storage modules is configured with a storage module local management network interface for connecting a management network and a storage module local storage network interface for connecting a storage network; the storage module local management network interface of each storage module is connected to each switching module through PCB traces on the backplane, and the storage module local storage network interface of each storage module is connected to each switching module through the PCB traces on the backplane; each storage module is further configured with a BMC and a network interface card; the method includes:

receiving, through a local network interface card of each storage module, service data forwarded by a service network, and forwarding, through the storage module local storage network interface of each storage module, the service data to each switching module connected with the storage module local storage network interface through the PCB traces;

accessing, through the PCB traces between each switching module and each storage module, the BMC of each storage module to obtain management data.

BRIEF DESCRIPTION OF THE DRAWINGS

The drawings herein are incorporated into the specification and constitute a part of the present disclosure, illustrating examples consistent with the present disclosure and serving, together with the specification, to explain the principles of the present disclosure.

DETAILED DESCRIPTION

In order to enable those skilled in the art to better understand the technical solutions provided by the examples of the present disclosure, and to make the above objectives, features, and advantages of the examples of the present disclosure more apparent and easier to understand, further detailed descriptions of the technical solutions in the examples of the present disclosure are provided below in conjunction with the accompanying drawings.

Figure 1:
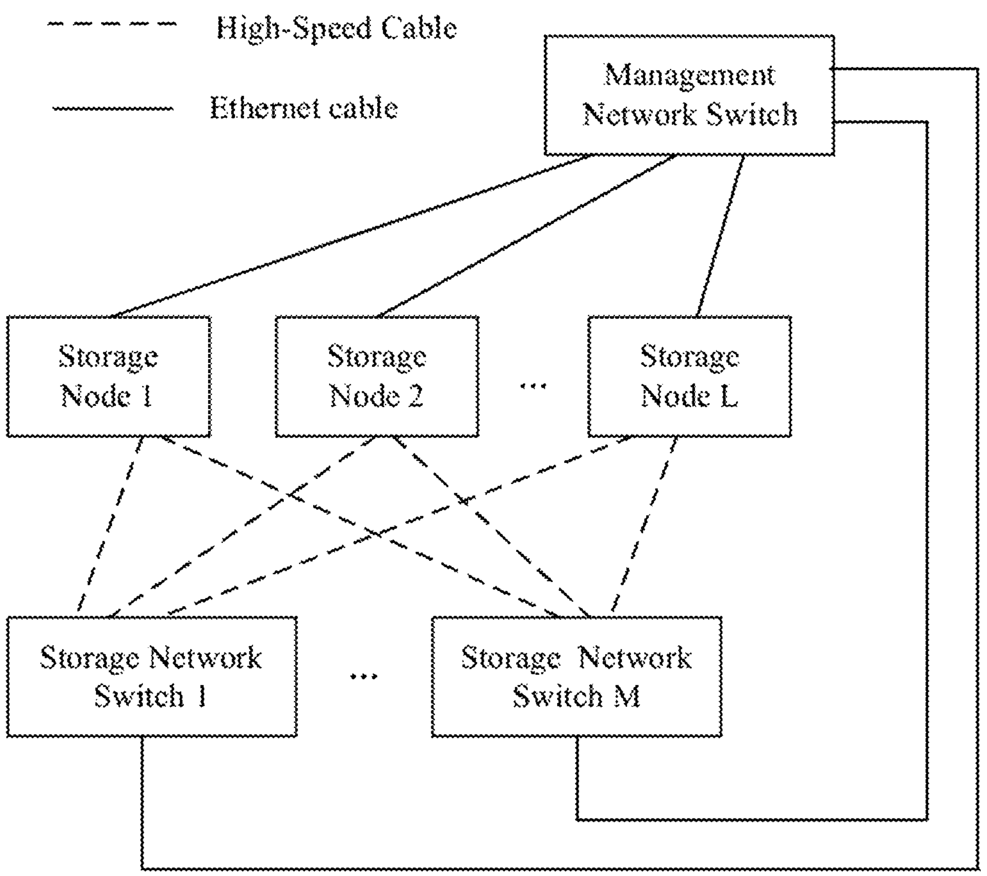
FIG. 1 is a schematic diagram illustrating an example of a switched network management provided in an example of the present disclosure.
Figure 2:
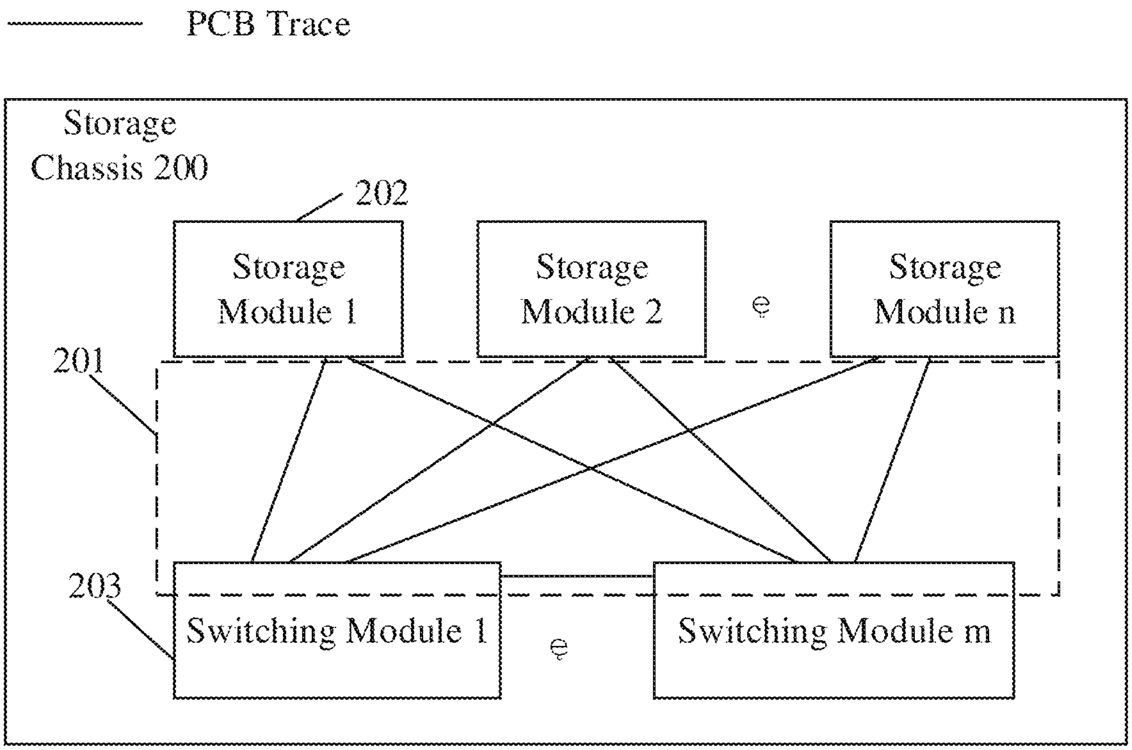
FIG. 2 is a schematic diagram of a storage chassis provided in an example of the present disclosure.

Refer to FIG. 2, which is a schematic diagram of a storage chassis provided in an example of the present disclosure. As shown in FIG. 2, the storage chassis 200 integrates a backplane 201, a plurality of storage modules 202, and a plurality of switching modules 203. Among them, each storage module 202 is configured with a storage module local management network interface for connecting a management network and a storage module local storage network interface for connecting a storage network. The storage module local management network interface of each storage module 202 is connected to each switching module 203 through PCB traces on the backplane 201, and the storage module local storage network interface of each storage module 202 is connected to each switching module 203 through the PCB traces on the backplane 201. Each storage module 202 is further configured with a Baseboard Management Controller (BMC) and a network interface card (NIC).

In this example, a storage module may be considered as a module for data storage. As an example, the storage module may be implemented as a module formed by integrating components such as a Central Processing Unit (CPU), a BMC, one or more NICs, and a plurality of memory sticks on a PCB board. Here, the physical layout of the components on the PCB board corresponding to the storage module is not limited and may be set based on actual needs. As an example, the NIC supports hot-plug operations and may be, for example, an Open Compute Project (OCP) NIC, etc., which is not limited in this example.

As an example, the storage module local storage network interface set in the aforementioned storage module for connecting the storage network may be implemented as Gigabit Ethernet (GE) network+serial port, or GE-Universal Asynchronous Receiver/Transmitter (UART) interface, etc. The storage module local management network interface set in the aforementioned storage module for connecting the management network may be implemented as a high-speed interface provided by Ethernet chips supporting the Remote Direct Memory Access (RDMA) protocol, etc. This example does not limit the specific examples of the storage module local storage network interface s and storage module local management network interfaces.

In this example, a switching module may be considered as a module that supports functions of both a storage network switch and a management network switch. As an example, the switching module may be implemented as a module formed by integrating components such as a processing chip for realizing a function of a storage network switch and a processing chip for realizing a function of a management network switch on a PCB board.

In this example, the aforementioned backplane may refer to a component that supports PCB traces for connecting each module within the storage chassis.

In this example, as an example, the physical layout of the backplane, the storage modules, and the switching modules within the storage chassis is not limited. For example, the backplane may be deployed in a middle area of the storage chassis; while the storage modules and the switching modules are deployed on different panels, such as deploying the storage modules on a front panel of the storage chassis and deploying the switching modules on a rear panel of the storage chassis, or deploying the storage modules on the rear panel of the storage chassis and deploying the switching modules on the front panel of the storage chassis; or, the storage modules and the switching modules are deployed on the same panel (such as the front panel or the rear panel).

Figure 3:
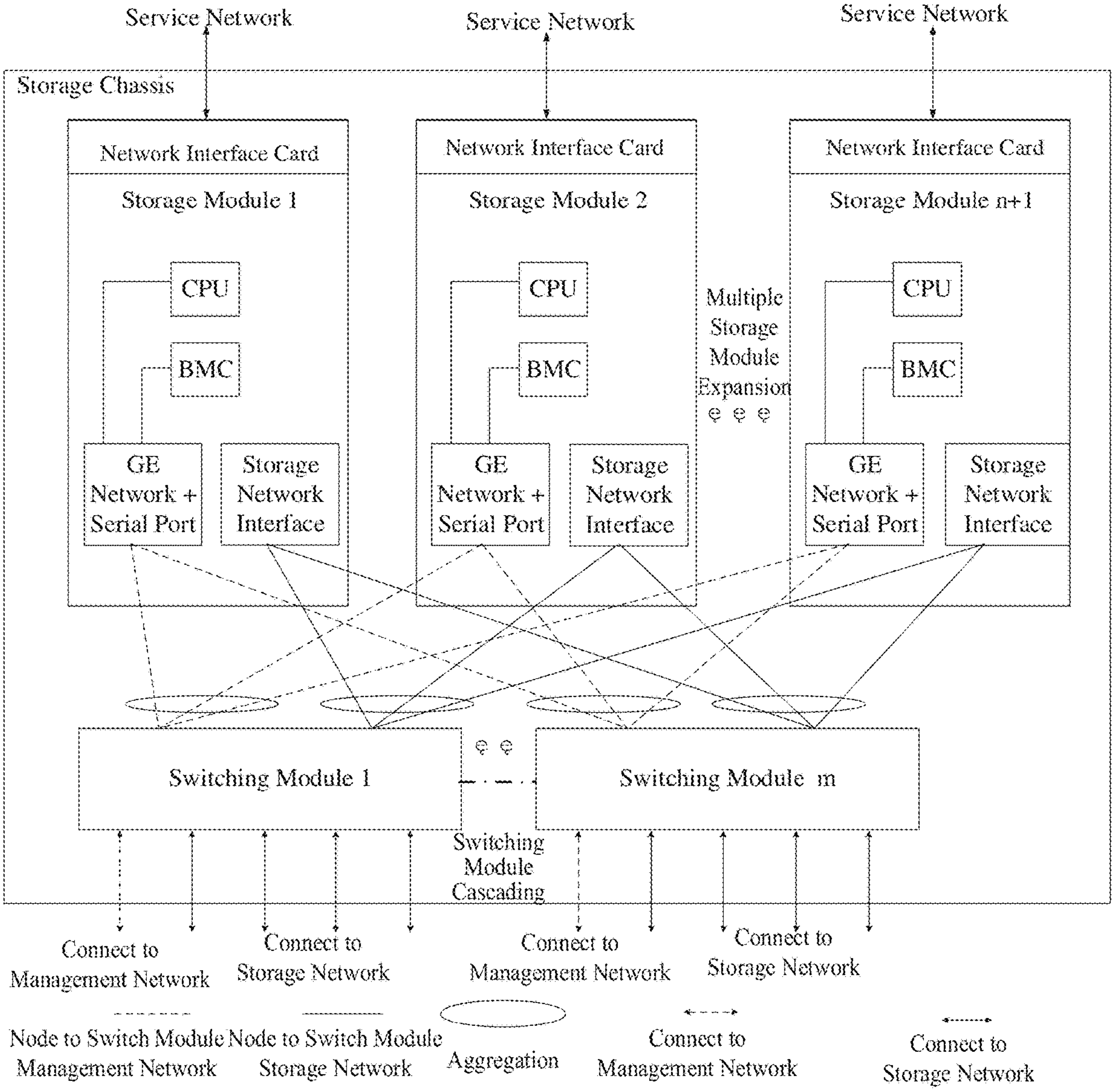
FIG. 3 is another schematic diagram of a storage chassis provided in an example of the present disclosure.

In this example, in conjunction with FIG. 3, first, each storage module receives service data forwarded by a service network through a local network interface card. Then, each storage module forwards, through the storage module local storage network interface, the service data to each switching module connected with the storage module local storage network interface through the PCB traces. Afterward, each switching module may forward the service data to other storage modules connected through the PCB traces, to realize the transmission of service data between various storage nodes, thereby ensuring balanced data landing on disks and improving storage performance. Here, the local network interface card and the storage module local storage network interface refer to the network interface card and the storage network interface set in the storage module.

In this example, as an example, for each storage module, for the service data received by the storage module through the local network interface card, it may be processed by the CPU set in the storage module, and then the processed service data is forwarded to the storage module local storage network interface of the storage module through the Peripheral Component Interconnect Express (PCIe) interface of the CPU, such that the storage module local storage network interface of the storage module forwards the processed service data to other storage modules connected through the PCB traces. Or, for the service data received by the storage module through the local network interface card, the processed service data may also be direct-forwarded, through the storage module local storage network interface of the storage module, to other storage modules connected through the PCB traces.

As an example, in conjunction with FIG. 3, for each switching module, the switching module may access the BMC of each storage module through the PCB traces connected to each storage module to obtain management data for network management. Here, management data may be data such as operating temperature, operating voltage, power consumption, CPU usage, and traffic monitoring of various network ports of the storage module, which is not limited in this example.

At this point, the structure shown in FIG. 2 is completed.

Through the structure shown in FIG. 2, it may be seen that the storage chassis provided by the example of the present disclosure integrates a backplane, a plurality of storage modules, and a plurality of switching modules, where the storage module local management network interface of each storage module is connected to each switching module through PCB traces on the backplane, and the storage module local storage network interface of each storage module is connected to the each switching module through PCB traces on the backplane. In this way, the communication connection between modules in the storage chassis is realized through PCB traces, which may avoid the problems of increased cabling costs and time costs caused by communication connections using physical connection lines, and reduce the difficulty of apparatus deployment and maintenance. Based on this, in this example, the service data received by the storage module through the local network interface card may be forwarded to each switching module connected through the PCB traces through the storage module local storage network interface, and each switching module may access the BMC of each storage module through the PCB traces between each switching module and each storage module to obtain management data. In this way, the data transmission between modules in the storage chassis is realized through PCB traces, which may avoid problems such as communication delay caused by physical connection lines and improve data transmission performance.

Furthermore, in the example of the present disclosure, one switching module serves as both the storage network switch and the management network switch, without the need to deploy separate storage network switch module and management network switch module. This method may not only simplify the architecture of the storage chassis, save space occupation of the storage chassis, but also reduce the time and economic costs of module deployment.

In order to ensure the normal operation of the storage chassis when a certain storage module or a switching module in the storage chassis is unplugged for maintenance, in this example, redundancy settings are made for each storage module of the storage chassis, and master-slave configurations are made for each switching module. The following describes in detail how to make redundancy settings for each storage module of the storage chassis and how to make master-slave configurations for each switching module:

As an example, one or more storage module in the storage chassis supports hot-plug operation. Here, hot-plug operation refers to inserting or removing hardware during system operation without interrupting the normal operation of the system. Based on the aforementioned situation, one storage module of the storage modules in the storage chassis is configured as a redundant storage module, and other storage modules in the storage modules excluding the redundant storage module share the same redundant storage module. In response to one of the other storage modules is unplugged, the service of the unplugged storage module is taken over by the redundant storage module, thereby ensuring the normal operation of the entire storage chassis.

As an example, one or more switching module in the storage chassis supports hot-plug operation. Based on the aforementioned situation, one switching module of the switching modules in the storage chassis is configured as a master switching module, and other switching modules in the switching modules excluding the master switching module are configured as slave switching modules. In response to determining that the master switching module is unplugged, the function of the master switching module is taken over by one of the slave switching modules, thereby ensuring the normal operation of the entire storage chassis.

The following further describes the configuration of the aforementioned storage chassis in conjunction with FIG. 3.

First, the switching modules of the aforementioned storage chassis are further described.

As an example, the plurality of switching modules are configured with two or more switching module first local management network interfaces (i.e., the interfaces corresponding to the double-headed dashed lines in FIG. 3) for connecting the management network and one or more switching module local storage network interfaces (i.e., the interfaces corresponding to the double-headed solid lines in the FIG. 3) for connecting the storage network.

In this example, the switching module first local management network interface of the switching module may be implemented as manageable Internet Protocol (IP) addresses/debugging serial ports, etc.; the switching module local storage network interface may be implemented as an optical port (i.e., fiber optic interface), etc.; this example is not limited.

In the present disclosure, as an example, the two or more switching module first local management network interfaces of the aforementioned switching modules are provided by different switch chips (Switch), which ensures that each switching module first local management network interface is independent and does not affect each other. Based on this, one of the switching module first local management network interfaces in the switching module is configured as a master management network interface, and other switching module first local management network interfaces of the switching module first local management network interfaces in the switching module excluding the master management network interface are configured as backup management network interfaces. Thus, in response to determining that the master management network interface in the switching modules fails, the function of the master management network interface may be taken over by one of the backup management network interfaces in the switching modules, thereby ensuring the reliability of the management network.

Based on the above description, it may be seen that the storage chassis provided in this example provides switching module second local management network interfaces for external through the switching module for network management of each module within the storage chassis. This eliminates the need for each storage module to provide a storage module local management network interface for external for the management of the storage module through separate physical ports such as network ports or serial ports. For example, in response to determining that there are N storage modules, this example may save N−2 actual storage module local management network interfaces, thereby reducing the occupation of physical space by actual physical ports and saving costs. Herein, N may be an integer not less than 2.

Moreover, as shown in FIG. 3, in the storage chassis provided in this example, the switching modules are also connected through PCB traces on the backplane, and each storage module is connected to each switching module through PCB traces on the backplane. That is to say, each switching module is converged from a plurality of upstreams of the storage modules. Based on this, in response to determining that one of the switching modules fails (such as hanging or crashing), the Baseboard Management Controller (BMC) of the storage module may be accessed through a standby switching module (i.e., other switching modules connected to the storage module through PCB traces) to obtain management data for network management, thereby improving the reliability of the management network.

In this example, as shown in FIG. 3, the switching module local storage network interfaces of the switching modules may transmit the service data of each storage module converged to the switching module to other external apparatuses. Here, the number of switching module local storage network interfaces of the switching modules may be flexibly set based on actual needs, and this example does not limit it.

For example, the switching module may support an n: k storage network configuration, where n represents the number of storage modules, and k represents the number of switching module local storage network interfaces of the switching modules, with the value of k being 1, 2, 4, . . . , k. In response to determining n=4, which indicates that the storage chassis integrates 4 storage modules. Assuming that the switching module local storage network interfaces of the switching modules are optical ports, and the upstream high-speed link of each storage module is 100 G (i.e., the maximum service data transmission volume from each storage module to the switching module is 100 G), then the maximum service data transmission volume of the four storage modules aggregated to one switching module is 400 G. Based on this, the switching module may be set based on actual service needs. For instance, in response to determining k=1, one switching module local storage network interface may connect to one 400 G optical module for storage network networking; in response to determining k=2, two switching module local storage network interfaces may connect to two 200 G optical modules respectively for storage network networking; in response to determining k=4, four switching module local storage network interfaces may connect to four 100 G optical modules respectively for storage network networking; and so on. In response to determining k=k, k storage network interfaces may connect to k 400/k G optical modules respectively for storage network networking.

Next, the power supply of the storage chassis is described.

As an example, the storage chassis further integrates two or more power supply modules. Each power supply module is connected to each switching module and each storage module through PCB traces on the backplane to supply power to the plurality of switching modules and the plurality of storage modules. Here, the power supply module may be implemented as a Power Supply Unit (PSU), etc., and this example does not limit it.

This example integrates power supply modules in the storage chassis and connects each switching module and each storage module through the PCB traces to supply power to the plurality of modules, thereby eliminating the need to configure a power supply module for each module in the storage chassis one by one to save the number of power supply modules and the space of the storage chassis.

Furthermore, this example further considers the impact of power supply module failures on the storage chassis. Therefore, to ensure the reliable operation of the storage chassis, the power supply modules are in a master-backup relationship. Thus, in response to determining that one of the power supply modules fails, the other power supply modules, excluding the failed power supply module, supply power to the plurality of switching modules and the plurality of storage modules, thereby avoiding issues such as the storage chassis crashing due to power supply module failures.

In this example, visual monitoring and management of each module within the storage chassis are also supported to facilitate the maintenance and management of the storage chassis by operation and maintenance personnel. How to perform visual monitoring and management of each module within the storage chassis is described below.

As an example, each switching module is configured with a target software program that provides a visual page. The switching module second local management network interface of each switching module is connected to an external designated apparatus for displaying the visual page. Here, the external designated apparatus may be a client computer apparatus, etc., and this example does not limit it.

In this example, the switching modules are cascaded through PCB traces on the backplane. In practical examples, the target software program in the master switching module is started to provide a visual page for the external designated apparatus. The visual page is to monitor and manage each storage module, each switching module, and each power supply module in the storage chassis. Here, the content of the visual page is not limited and may include the operating status, service traffic, bandwidth, CPU usage, load, and memory usage of each module, as well as configuration options for each module to allow operation and maintenance personnel to configure and manage based on actual service needs.

In this example, the aforementioned storage chassis further supports dynamic adjustments of the overall power consumption and fan rotational speeds to keep the overall power consumption and fan rotational speeds within a reasonable range, ensuring the normal and reliable operation of the storage chassis. Next, how to dynamically adjust the overall power consumption and fan rotational speeds are described:

As an example, the target software program in the master switching module is further to determine whether the power consumption of the storage chassis needs to be adjusted based on the power consumption of the storage chassis, and is to adjust the power consumption of the storage chassis based on an operating condition of each storage module after determining that the power consumption of the storage chassis needs to be adjusted.

In this example, there are many specific example methods for determining whether the power consumption of the storage chassis needs to be adjusted based on the power consumption of the storage chassis. For example, as an example, first, the power consumption of the storage chassis is obtained. Then, the total service traffic of each storage module within a specified time period is obtained. After that, the reference power consumption corresponding to the aforementioned total service traffic is determined based on a configured power consumption-service traffic mapping table. In response to determining that the power consumption of the storage chassis is greater than the reference power consumption, then there is power consumption waste in the storage chassis, and the power consumption of the storage chassis needs to be adjusted to a reasonable range at this time, i.e., it is determined that the power consumption of the storage chassis needs to be adjusted. In response to determining the power consumption of the storage chassis is less than or equal to the reference power consumption, then there is no power consumption waste in the storage chassis, and it is determined that the power consumption of the storage chassis does not need to be adjusted at this time.

In this example, the power consumption of the aforementioned storage chassis refers to the sum of the power consumption of each module (such as storage modules, switching modules, optical modules connected to the switching modules, etc., and this example does not limit it) in the storage chassis. In normal conditions, the power consumption data of each module is calculated at regular intervals and stored in a designated storage space of each module. Based on this, the aforementioned obtaining of the power consumption of the storage chassis may be implemented as: for each module, obtaining the power consumption of the module from the corresponding designated storage space of the module, and determining the sum of the power consumption of each module as the power consumption of the storage chassis.

In this example, the aforementioned specified time period refers to a time period ending at the time of obtaining the total service traffic. The aforementioned obtaining of the total service traffic of each storage module within the specified time period is similar to the aforementioned obtaining of the power consumption of the storage chassis. For example, the service traffic may be obtained from the designated storage space of each storage module within the specified time period, with the sum of the service traffic of each storage module within the specified time period being determined as the total service traffic of each storage module within the specified time period. Here, service traffic refers to the amount of service data received by the storage module within the specified time period.

In the present disclosure, after determining that the power consumption of the storage chassis needs to be adjusted, the power consumption of the storage chassis is adjusted based on the operating condition of each storage module. There are various example methods for achieving this in practice. For example, the state of the current idle storage module which is not processing service may be switched to a standby state, and/or the state of one or more idle optical module connected to the switching module may be controlled to switch to a standby state, to adjust the power consumption of the storage chassis into a power consumption range associated with the reference power consumption. Here, an idle optical module may be understood as an optical module that has not being used for data transmission. The power consumption range associated with the reference power consumption, for example, refers to a power consumption range with the reference power consumption as a median value, and the difference between the upper limit and lower limit of the range as a set value, and the present disclosure does not provide specific limitations.

The above describes how to dynamically adjust the power consumption of the entire apparatus. Below is a description of how to dynamically adjust the fan rotational speeds of the storage chassis.

As an example, the storage module is configured with one or more fan assemblies; the target software program in the master switching module is further to adjust the rotation speeds of the one or more fan assemblies of each storage module based on the power consumption of the storage chassis, such that the storage chassis operates within a specified temperature range.

In the present disclosure, the rotation speeds of the one or more fan assemblies of each storage module are adjusted based on the power consumption of the storage chassis, such that the storage chassis operates within a specified temperature range, which may be applied, for example, by: first, obtaining the power consumption of the storage chassis; then, determining the target fan rotation speed corresponding to the power consumption of the storage chassis based on a pre-configured power consumption-fan rotation speed correspondence relationship; then, controlling the fan rotation speed of each storage module to be the target fan rotation speed, such that the storage chassis operates within the specified temperature range.

It should be noted that the power consumption and fan rotation speeds of the storage chassis in the present example may not only be adjusted but may also be monitored through the aforementioned visual page, and the modules within the storage chassis may be controlled by user through configuration options on the visual page, such that the storage chassis operates within a reasonable power consumption range and within a reasonable temperature range.

So far, the structural description of the storage chassis provided by the example of the present disclosure has been completed. Below is a description of the storage system provided by the example of the present disclosure.

Figure 4:
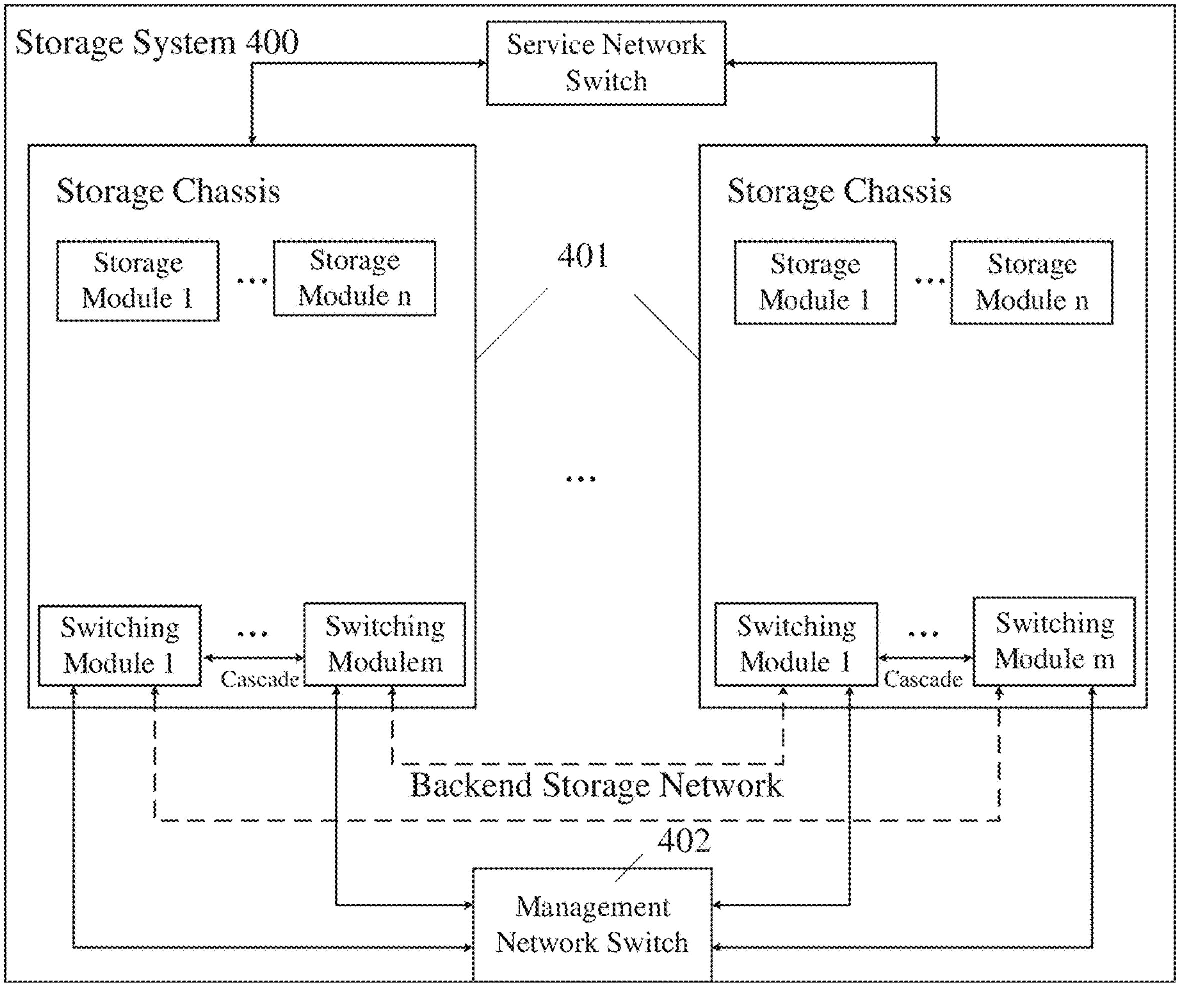
FIG. 4 is a schematic diagram of a storage system provided in an example of the present disclosure.

Refer to FIG. 4, which is a schematic diagram of a storage system provided by an example of the present disclosure. As shown in FIG. 4, the storage system 400 includes two or more storage chassis 401 as shown in FIG. 2.

The storage chassis 401 integrates a backplane, a plurality of storage modules, and a plurality of switching modules; each storage module of the plurality of storage modules is configured with a storage module local management network interface for connecting a management network and a storage module local storage network interface for connecting a storage network; the storage module local management network interface of each storage module is connected to each switching module through PCB trace on the backplane, and the storage module local storage network interface of each storage module is connected to each switching module through PCB trace on the backplane; each storage module is further configured with a BMC and a network interface card; each storage module is to receive service data forwarded by a service network through a local network interface card; each storage module is to forward, through the storage module local storage network interface, the service data to each switching module connected with the storage module local storage network interface through PCB trace; each switching module is to access the BMC of each storage module to obtain management data through the PCB traces between each switching module and each storage module;

the plurality of switching module are configured with two or more switching module first local management network interfaces for connecting the management network and a plurality of switching module local storage network interfaces for connecting the storage network;

the switching module local storage network interface of one or more switching modules located on each storage chassis 401 is connected to the switching module local storage network interface of one or more switching modules located on other storage chassis, such that connections between the storage networks of two or more storage chassis are established; each switching module of each storage chassis 401 is connected to the management network switch 402 through one or more switching module first local management network interface to achieve the management of the management network of each storage chassis 401.

In the present example, a plurality of storage chassis are cascaded to form a storage system, and the cascading and expansion of the backend storage network may be achieved through the external storage network interface provided by the switching module in the storage chassis without the need for an additional storage network switch, which may save equipment costs; and the switching module in the storage chassis also supports data transmission to other storage chassis, improving the performance of data interaction between different storage chassis.

As an example, one or more storage module in the storage chassis supports hot-plug operation.

One storage module of the plurality of storage modules in the storage chassis is configured as a redundant storage module, and other storage modules of the plurality of storage modules excluding the redundant storage module share the same redundant storage module; when one of the other storage modules is unplugged, the service of the unplugged storage module is taken over by the redundant storage module.

As an example, one or more switching module in the storage chassis supports hot-plug operation.

One switching module of the plurality of switching modules in the storage chassis is configured as a master switching module, and other switching modules of the plurality of switching modules excluding the master switching module are configured as slave switching modules; in response to the master switching module is unplugged, the function of the master switching module is taken over by one of the slave switching modules.

As an example, the switching module is configured with two or more switching module first local management network interfaces for connecting the management network and a plurality of secondary storage network interfaces for connecting the storage network;

one of the two or more switching module first local management network interfaces of the plurality of switching modules is configured as a master management network interface, and other switching module first local management network interfaces of the two or more switching module first local management network interfaces excluding the master management network interface are configured as backup management network interfaces; in response to determining that the master management network interface in the switching modules fails, the function of the master management network interface is taken over by one of the backup management network interfaces of the switching modules.

As an example, the storage chassis further integrates two or more power modules; each power module of the two or more power modules is connected to each switching module and each storage module through PCB traces on the backplane to supply power to the plurality of switching modules and the plurality of storage modules;

The two or more power modules are in a master-backup relationship or have a mutual standby relationship with each other; in response to that one of the power modules fails, the other power modules of the two or more power modules, excluding the failed power module, supply power to the plurality of switching modules and the plurality of storage modules.

As an example, each switching module is configured with a target software program that provides a visual page; the switching module second local management network interface of each switching module is connected to an external designated apparatus for displaying the visual page; the plurality of switching modules are cascaded through PCB traces on the backplane;

a target software program in the master switching module is started to provide the visual page for the external-designated apparatus, and the visual page is to monitor and manage each storage module, each switching module, and each power module in the storage chassis.

As an example, the target software program in the master switching module is further to determine whether a power consumption of the storage chassis needs to be adjusted based on the power consumption of the storage chassis, and is to adjust the power consumption of the storage chassis based on an operating condition of each storage module after determining that the power consumption of the storage chassis needs to be adjusted;

each storage module is configured with one or more fan assemblies; the target software program in the master switching module is further to adjust the rotational speeds of the one or more fan assemblies of each storage module based on the power consumption of the storage chassis, such that the storage chassis operates within a specified temperature range.

Figure 5:
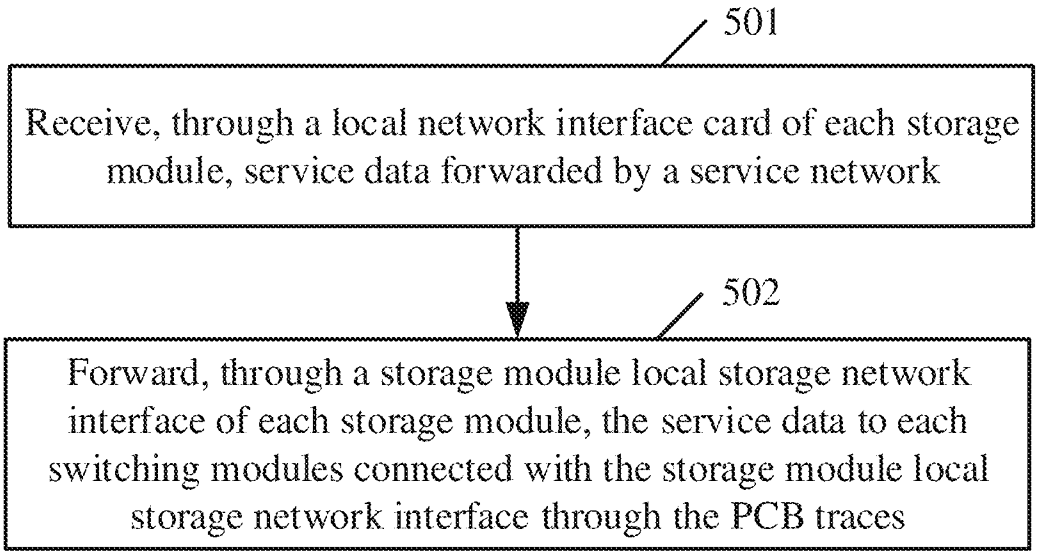
FIG. 5 is a schematic diagram of a method provided in an example of the present disclosure.

Up to this point, the structural description of the system shown in FIG. 4 is completed. Hereinafter, the data processing method applied to the storage chassis provided by the examples of the present disclosure is described:

Refer to FIG. 5, which is a method schematic diagram provided by an example of the present disclosure. The method is applied to a storage chassis that integrates a backplane, a plurality of storage modules, and a plurality of switching modules; each storage module of the plurality of storage modules is configured with a storage module local management network interface for connecting a management network and a storage module local storage network interface for connecting a storage network; the storage module local management network interface of each storage module is connected to each switching module through PCB traces on the backplane, and the storage module local storage network interface of each storage module is connected to each switching module through PCB traces on the backplane; each storage module is further configured with a Baseboard Management Controller (BMC) and a network interface card; as shown in FIG. 5, the method includes the following processes:

at process 501: receiving, through a local network interface card of each storage module, service data forwarded by a service network.

at process 502: forwarding, through the storage module local storage network interface of each storage module, the service data to each switching module connected with the storage module local storage network interface through the PCB traces.

As an example, the method further includes: accessing, through the PCB traces between each switching module and each storage module, the BMC of each storage module to obtain management data.

As an example, one or more storage modules of the plurality of storage modules in the storage chassis are to support hot-plug operation; one storage module of the plurality of storage modules in the storage chassis is configured as a redundant storage module, and the other storage modules of the plurality of storage modules, excluding the redundant storage module, share the same redundant storage module; in response to determining that one of the other storage modules is unplugged, the service of the unplugged storage module is taken over by the redundant storage module.

As an example, one or more switching modules of the plurality of switching modules in the storage chassis are to support hot-plug operation; one switching module of the plurality of switching modules in the storage chassis is configured as a master switching module, and other switching modules of the plurality of switching modules excluding the primary switching module are configured as slave switching modules; in response to determining that the master switching module is unplugged, the function of the master switching module is taken over by one of the slave switching modules.

As an example, plurality of switching modules are configured with two or more switching module first local management network interfaces for connecting the management network and a plurality of secondary storage network interfaces for connecting the storage network; one of the two or more switching module first local management network interfaces of the plurality of switching modules is configured as a master management network interface, and other switching module first local management network interfaces of the two or more switching module first local management network interfaces excluding the master management network interface are configured as backup management network interfaces; in response to determining that the master management network interface in the switching modules fails, the function of the master management network interface is taken over by one of the backup management network interfaces of the switching modules.

As an example, the storage chassis further integrates two or more power modules; each of the two or more power module is connected to each switching module and each storage module through PCB traces on the backplane to supply power to the plurality of switching modules and the plurality of storage modules; the two or more power modules are in a master-backup relationship or have a mutual standby relationship with each other; in response to determining that one of the power modules fails, other power modules of the two or more power modules excluding the failed power module supply power to the plurality of switching modules and the plurality of storage modules.

As an example, each switching module is configured with a target software program that provides a visual page; the switching module second local management network interface of each switching module is connected to an external designated apparatus for displaying the visual page; the plurality of switching modules are cascaded through PCB traces on the backplane; a target software program in the master switching module is started to provide the visual page for the external designated apparatus, and the visual page is to monitor and manage each storage module, each switching module, and each power module in the storage chassis.

As an example, the target software program in the master switching module is further to determine whether a power consumption of the storage chassis needs to be adjusted based on the power consumption of the storage chassis, and is to adjust the power consumption of the storage chassis based on an operating condition of each storage module after determining that the power consumption of the storage chassis needs to be adjusted; each storage module is configured with one or more fan assemblies; the target software program in the master switching module is further to adjust rotational speeds of the one or more fan assemblies of each storage module based on the power consumption of the storage chassis, such that the storage chassis operates within a specified temperature range.

For the system and method examples, since they correspond to the aforementioned storage chassis examples, reference may be made to the partial description of the storage chassis examples for related content.

The above are examples of the present disclosure and are not used to limit the present disclosure. Any modifications, equivalent substitutions, improvements, etc., made within the present disclosure, should be included within the scope of protection of the present disclosure.

The invention claimed is:

1. A storage chassis, wherein the storage chassis integrates a backplane, a plurality of storage modules, and a plurality of switching modules; each storage module is configured with a storage module local management network interface for connecting a management network, and set with a storage module local storage network interface for connecting a storage network; the storage module local management network interface of each storage module is connected to each switching module through printed circuit board (PCB) traces on the backplane, and the storage module local storage network interface of each storage module is connected to each switching module through the PCB traces on the backplane; each storage module is further configured with a baseboard management controller (BMC) and a network interface card;

each storage module is to receive service data forwarded by a service network through a local network interface card;

each storage module is to forward, through the storage module local storage network interface, the service data to each switching module connected with the storage module local storage network interface through the PCB traces;

each switching module is to access the BMC of each storage module to obtain management data through the PCB traces between each switching module and each storage module.

2. The storage chassis of claim 1, wherein, one or more of the plurality of storage modules in the storage chassis are to support hot-plug operation;

one of the plurality of storage modules in the storage chassis is configured as a redundant storage module; wherein the redundant storage module is shared by other storage modules of the plurality of storage modules excluding the redundant storage module, and is to take over service of one of the other storage modules after the one of the other storage modules is removed from the storage chassis.

3. The storage chassis of claim 1, wherein one or more of the plurality of switching modules in the storage chassis are to support hot-plug operation;

one of the plurality of switching modules in the storage chassis is configured as a master switching module, and other switching modules of the plurality of switching modules excluding the master switching module are configured as slave switching modules; wherein one of the slave switching modules is to take over a function of the master switching module after the master switching module is removed from the storage chassis.

4. The storage chassis of claim 1, wherein the plurality of switching modules are configured with two or more switching module first local management network interfaces for connecting the management network, and a plurality of switching module local storage network interfaces for connecting the storage network;

one of the two or more switching module first local management network interfaces of the plurality of switching modules is configured as a master management network interface, and other switching module first local management network interfaces of the two or more switching module first local management network interfaces excluding the master management network interface are configured as backup management network interfaces; wherein one of the backup management network interfaces is to take over a function of the master management network interface after the master management network interface fails.

5. The storage chassis of claim 1, wherein the storage chassis is further integrated with two or more power modules, each of the two or more power modules is connected to each switching module and each storage module through the PCB traces on the backplane to supply power to the plurality of switching modules and the plurality of storage modules;

the two or more power modules are in a master-backup relationship; wherein upon a failure of one of the two or more power modules, other power modules of the two or more power modules excluding the failed power module continue to supply power to the plurality of switching modules and the plurality of storage modules.

6. The storage chassis of claim 1, wherein each switching module is configured with a target software program that provides a visual page;

the switching module second local management network interface of each switching module is connected to an external designated apparatus for displaying the visual page; the plurality of switching modules are cascaded through the PCB traces on the backplane;

a target software program in the master switching module is started to provide the visual page for the external designated apparatus, and the visual page is to monitor and manage each storage module, each switching module, and each power module in the storage chassis.

7. The storage chassis of claim 6, wherein the target software program in the master switching module is further to determine whether a power consumption of the storage chassis needs to be adjusted based on the power consumption of the storage chassis, and is to adjust the power consumption of the storage chassis based on an operating condition of each storage module after determining that the power consumption of the storage chassis needs to be adjusted;

each storage module is configured with one or more fan assemblies; the target software program set in the master switching module is further to adjust fan rotational speeds of the one or more fan assemblies of each storage module based on the power consumption of the storage chassis, such that the storage chassis operates within a temperature range.

8. A storage system, wherein the storage system comprises two or more storage chassis;

each of the storage chassis integrates a backplane, a plurality of storage modules, and a plurality of switching modules; each storage module of the plurality of storage modules is configured with a storage module local management network interface for connecting a management network, and set with a storage module local storage network interface for connecting a storage network; the storage module local management network interface of each storage module is connected to each switching module through printed circuit board (PCB) traces on the backplane, and the storage module local storage network interface of each storage module is connected to each switching module through the PCB traces on the backplane; each storage module is further configured with a baseboard management controller (BMC) and a network interface card; each storage module is to receive service data forwarded by a service network through a local network interface card; each storage module is to forward, through the storage module local storage network interface, the service data to each switching module connected with the storage module local storage network interface through the PCB traces; each switching module is to access the BMC of each storage module to obtain management data through the PCB traces between each switching module and each storage module;

the plurality of switching modules are configured with two or more switching module first local management network interfaces for connecting the management network, and are set with a plurality of switching module local storage network interfaces for connecting the storage network;

a switching module local storage network interface of one or more switching modules located on each storage chassis is connected to a switching module local storage network interface of one or more switching modules located on other storage chassis, such that connections between storage networks of two or more storage chassis are established; each switching module of each storage chassis is connected to a management network switch through one or more switching module first local management network interfaces, to manage management networks of each storage chassis.

9. A data processing method of a storage chassis, wherein the storage chassis integrates a backplane, a plurality of storage modules, and a plurality of switching modules; each storage module of the plurality of storage modules is configured with a storage module local management network interface for connecting a management network, and set with a storage module local storage network interface for connecting a storage network; the storage module local management network interface of each storage module is connected to each switching module through printed circuit board (PCB) traces on the backplane, and the storage module local storage network interface of each storage module is connected to each switching module through the PCB traces on the backplane; each storage module is further configured with a baseboard management controller (BMC) and a network interface card; the method comprises:

receiving, through a local network interface card of each storage module, service data forwarded by a service network, and forwarding, through the storage module local storage network interface of each storage module, the service data to each switching module connected with the storage module local storage network interface through the PCB traces;

accessing, through the PCB traces between each switching module and each storage module, the BMC of each storage module to obtain management data.

10. The method of claim 9, wherein one or more storage modules of the plurality of storage modules in the storage chassis are to support hot-plug operation;

one storage module of the plurality of storage modules in the storage chassis is configured as a redundant storage module; wherein the redundant storage module is shared by other storage modules of the plurality of storage modules excluding the redundant storage module, and is to take over service of one of the other storage modules after the one of the other storage modules is removed from the storage chassis.

11. The method of claim 9, wherein one or more switching modules of the plurality of switching modules in the storage chassis are to support hot-plug operation;

one switching module of the plurality of switching modules in the storage chassis is configured as a master switching module, and other switching modules of the plurality of switching modules excluding the master switching module are configured as slave switching modules; wherein one of the slave switching modules is to take over a function of the master switching module after the master switching module is removed from the storage chassis.

12. The method of claim 9, wherein the plurality of switching modules are configured with two or more switching module first local management network interfaces for connecting the management network, and are set with a plurality of switching module local storage network interfaces for connecting the storage network;

one of the two or more switching module first local management network interfaces of the plurality of switching modules is configured as a master management network interface, and other switching module first local management network interfaces of the two or more switching module first local management network interfaces excluding the storage module local management network interface are configured as backup management network interfaces; wherein one of the backup management network interfaces is to take over a function of the master management network interface after the master management network interface fails.

13. The method of claim 9, wherein the storage chassis is further integrated with two or more power modules, each of the two or more power modules is connected to each switching module and each storage module through the PCB traces on the backplane to supply power to the plurality of switching modules and the plurality of storage modules;

the two or more power modules are in a master-backup relationship; wherein upon a failure of one of the two or more power modules, other power modules of the two or more power modules excluding the failed power module continue to supply power to the plurality of switching modules and the plurality of storage modules.

14. The method of claim 9, wherein each switching module is configured with a target software program that provides a visual page;

the switching module second local management network interface of each switching module is connected to an external designated apparatus for displaying the visual page; the plurality of switching modules are cascaded through the PCB traces on the backplane;

a target software program in the master switching module is started to provide the visual page for the external designated apparatus, and the visual page is to monitor and manage each storage module, each switching module, and each power module in the storage chassis.

15. The method of claim 14, wherein the target software program in the master switching module is further to determine whether a power consumption of the storage chassis needs to be adjusted based on the power consumption of the storage chassis, and is to adjust the power consumption of the storage chassis based on an operating condition of each storage module after determining that the power consumption of the storage chassis needs to be adjusted;

each storage module is configured with one or more fan assemblies; the target software program set in the master switching module is further to adjust rotational speeds of the one or more fan assemblies of each storage module based on the power consumption of the storage chassis, such that the storage chassis operates within a temperature range.

* * * * *